United States Patent
Nishizawa et al.

(10) Patent No.: US 7,111,019 B1
(45) Date of Patent: Sep. 19, 2006

(54) DATA WAREHOUSE SYSTEM AND QUERY PROCESSING METHOD USED IN THE SYSTEM, AND DATA COLLECTING METHOD AND APPARATUS FOR THE METHOD, AND CHARGING METHOD AND APPARATUS IN THE SYSTEM

(75) Inventors: Itaru Nishizawa, Kodaira (JP); Shinji Fujiwara, Sagamihara (JP); Kazutomo Ushijima, Kokubunji (JP); Shigekazu Inohara, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/435,034

(22) Filed: Nov. 5, 1999

(30) Foreign Application Priority Data

Nov. 11, 1998 (JP) ................................ 10-320203

(51) Int. Cl.
 *G06F 12/00* (2006.01)
 *G06F 17/30* (2006.01)
 *G06F 7/00* (2006.01)

(52) U.S. Cl. ........................................ 707/201; 707/10
(58) Field of Classification Search ................ 707/10, 707/201

See application file for complete search history.

(56) References Cited

U.S. PATENT DOCUMENTS

| | | | | |
|---|---|---|---|---|
| 4,755,889 A | * | 7/1988 | Schwartz ..................... | 360/32 |
| 5,423,037 A | * | 6/1995 | Hvasshovd .................. | 707/202 |
| 5,555,404 A | * | 9/1996 | Torbjornsen et al. ....... | 707/202 |
| 5,758,337 A | * | 5/1998 | Hammond .................... | 707/6 |
| 5,898,794 A | * | 4/1999 | Sonohara et al. ........... | 382/166 |
| 5,924,108 A | * | 7/1999 | Fein et al. .................. | 707/531 |
| 5,970,485 A | * | 10/1999 | Sugaya et al. ................ | 707/4 |
| 5,978,788 A | * | 11/1999 | Castelli et al. ................ | 707/2 |

(Continued)

FOREIGN PATENT DOCUMENTS

JP        8286960        11/1996

(Continued)

OTHER PUBLICATIONS

Heddaya, A. and Mirdad, S. "WebWave: Globally Load Balanced Fully Distributed Caching of Hot Published Documents", Proceedings of the 17th International Conference on Distributed Computing Systems, May 27-30, 1997, pp. 160-168.*

(Continued)

*Primary Examiner*—Luke S Wassum
(74) *Attorney, Agent, or Firm*—Mattingly, Stanger, Malur & Brundidge, P.C.

(57) ABSTRACT

In order to realize a practical data warehouse system with the use of a network in a distributed environment, for example, data collectors (101 and 102) for creating/managing each replica of server data for clients (103 and 104) as shown in FIG. 1 are connected to a network (113). A data collector holds a data request condition given from a user via a client and negotiates with a server (114, 122) which supplies data according to such resources as a storage unit, a CPU, etc. usable by the data collector, thereby the range and quality of the data for which a replica is to be created can be adjusted. For query processing, a part or the whole of a query from a client is processed with the use of a replica (123) created in the data collector. Queries which cannot be processed with any replica in the data collector are transferred to the server. Because a replica created in the data collector can be used to process a query from a client device such a way, the server load can be reduced.

3 Claims, 13 Drawing Sheets

U.S. PATENT DOCUMENTS

| | | | | |
|---|---|---|---|---|
| 5,978,813 | A | * | 11/1999 | Foltz et al. ................. 707/201 |
| 5,982,432 | A | * | 11/1999 | Uenoyama et al. ......... 348/453 |
| 5,995,980 | A | * | 11/1999 | Olson et al. ................ 707/201 |
| 6,052,718 | A | * | 4/2000 | Gifford ....................... 709/219 |
| 6,148,412 | A | * | 11/2000 | Cannon et al. ................. 714/6 |
| 6,167,427 | A | * | 12/2000 | Rabinovich et al. ........ 709/201 |
| 6,226,650 | B1 | * | 5/2001 | Mahajan et al. ............ 707/201 |
| 6,256,675 | B1 | * | 7/2001 | Rabinovich ................. 709/241 |
| 6,484,204 | B1 | * | 11/2002 | Rabinovich ................. 709/226 |
| 6,542,964 | B1 | * | 4/2003 | Scharber ..................... 711/122 |
| 2001/0011301 | A1 | * | 8/2001 | Sato et al. .................. 709/219 |
| 2001/0032207 | A1 | * | 10/2001 | Hartley et al. .............. 707/102 |

FOREIGN PATENT DOCUMENTS

| | | |
|---|---|---|
| JP | 9297702 | 11/1997 |
| JP | 10269248 | 10/1998 |

OTHER PUBLICATIONS

Chappell, D. "Understanding ActiveX and OLE", Redmond:Microsoft Press, 1996, Chapter 10.*

Acharya, S. and S.B. Zdonik "An Efficient Scheme for Dynamic Data Replication", Technical Report CS-93-43, Brown Universi Department of Computer Science, Sep. 1993.*

Wolfson, O., S. Jajodia and Y. Huang "An Adaptive Data Replication Algorithm", ACM Transactions on Database Systems, vol. 22, No. 2, pp. 255-314, Jun. 1997.*

W. H. Inmon, John Wiley & Sons, Inc., ISBNO-471-14161-5, pp. 33-72, "Building the Data Warehouse Second Edition".

R. Orfaili et al, "Client/Server Programming with JAVA and CORBRA Second Edition", John Wiley & Sons, Inc., ISBNO-471-24578-X, pp. 3-31.

Optimization for Conjunctive Queries, Chapter 14, Containment and Equivalence of Conjunctive Queries, pp. 877-911.

The Nuts and Bolts of the Java Language, Writing Java Programs, pp. 43-76.

C. Pu, et al, Update Monitoring: The CQ Project, Department of Computer Science & Engineering, pp. 9-23.

A. Keller, et al, A Predicate-based Caching Scheme for Client-Server Database Architectures, The VLDB Journal, (1996), vol. 5, pp. 35-47.

TPC Benchmark D (Decision Support), Standard Specification, Revision 1.2.2, Transaction Processing Performance Counsil, pp. 1-165.

A. Sheth, Multidatabase Interdependencies in Industry, Proc. 1993, ACM Sigmod, vol. 22, pp. 483-486.

A. Sheth, Federated Database Systems for Managing Distributed Heterogenous and Autonomous Databases, ACM Computing Surveys, vol. 22, No. 3, Sep. 1990, pp. 183-236.

* cited by examiner

Fig. 5

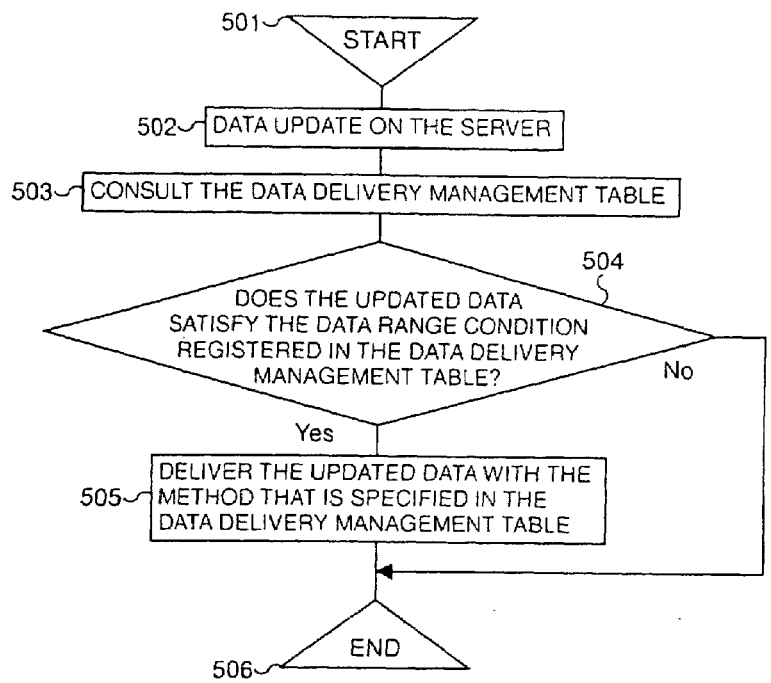

Fig. 6

REPLICA CREATION REQUEST

| DATA RANGE | DATA QUALITY | DELIVERY METHOD |
|---|---|---|
| ORDER(ORDER_ID, PRICE, CUSTOMER_ID) PRICE>=10000 | | 13:00, PUSH |
| ORDER(ORDER_ID, PRICE, CUSTOMER_ID), 5000<=PRICE<=8000 | FRESH(ORDER, 1 HOUR) 605 | {1:00, 13:00}, PULL |
| ORDER(ORDER_ID, PRICE, CUSTOMER_ID), PRICE<=2000 | SAMPLE(ORDER, ORDER_ID, 10%) 606 | ONCE BETWEEN 21:00 AND 23:00, PULL |
| SALESDETAIL(ORDER_ID, SHIPDATE, ORDER_AMOUNT), SHIPDATE>=1990/01/01 | TOP-N(SALESDATAIL, ORDER_AMOUNT, 100) 607 | ONCE PER 1 HOUR, PULL |
| ... | ... | ... |

Fig. 7

| DATA TYPE | DATA QUALITY ADJUSTMENT METHOD |
|---|---|
| RELATIONAL DATABASE RECORD | RECORD SAMPLING, COLUMN PROJECTION |
| DOCUMENT | KEYWORD EXTRACTION, SUMMARY CREATION |
| IMAGE | IMAGE COMPRESSION, IMAGE FORMAT CONVERSION, EXTRACT OUTLINE, REDUCE THE NUMBER OF COLORS, REDUCE RESOLUTION, MAKE IMAGE SIZE SMALLER |
| MOVIE | REDUCE FRAME RATE, IMAGE COMPRESSION IN A FRAME |
| SOUND | CHANGE SAMPLING RATE, CONVERT TO CHARACTER INFORMATION |

Fig. 8

REPLICA MANAGEMENT

| REPLICA DESCRIPTION | | REPLICA LOCATION | SERVER LOCATION | DELIVERY METHOD |
|---|---|---|---|---|
| DATA RANGE 801 | DATA QUALITY | | | |
| ORDER(ORDER_ID, PRICE, CUSTOMER_ID), PRICE>=10000 | - | DATA COLLECTOR (1) | SERVER (1) | 13:00, PUSH |
| ORDER(ORDER_ID, PRICE, CUSTOMER_ID), PRICE>=10000 | 807 — 808 | DATA COLLECTOR (3) | SERVER (1) | {1:00, 13:00}, PULL |
| ORDER(ORDER_ID, PRICE), PRICE<=3000 | - | DATA COLLECTOR (2) | SERVER (2) | 12:00, PUSH |
| ORDER(ORDER_ID, PRICE), 3000<=PRICE<=5000 | SAMPLE(ORDER, ORDER_ID, 10%) | DATA COLLECTOR (2) | SERVER (2) | ONCE PER 2 HOURS, PULL |

DELIVERY DATA MANAGEMENT TABLE

| DATA RANGE (901) | DATA QUALITY (902) | DELIVERY DESTINATION (903) | DELIVERY METHOD (904) | |
|---|---|---|---|---|
| ORDER(ORDER_ID, PRICE, CUSTOMER_ID), PRICE>=10000 | - | DATA COLLECTOR (1) | 13:00, PUSH | 905 |
| ORDER(ORDER_ID, PRICE, CUSTOMER_ID), PRICE>=10000 | - | DATA COLLECTOR (3) | {1:00, 13:00}, PUSH | 906 |
| ORDER(ORDER_ID, PRICE, CUSTOMER_ID), PRICE>=50000 | TOP-N(ORDER, PRICE, 10) | DATA COLLECTOR (7) | ONCE PER 1 HOUR, PULL | |
| ... | ... | ... | ... | |

INSERT DATA (ORDER_ID, PRICE, CUSTOMER_ID) = (10005, 12500, 256) — 907

Fig. 10 (A)

(A) DELIVERY CREATION REQUEST

| DATA RANGE | DATA QUALITY | DELIVERY METHOD | |
|---|---|---|---|
| ORDER(ORDER_ID, PRICE, CUSTOMER_ID) PRICE>=10000 | - | 13:00, PUSH | 1001 |
| ORDER(ORDER_ID, PRICE, CUSTOMER_ID), 5000<=PRICE<=8000 | FRESH(ORDER, 1 HOUR) | {1:00, 13:00}, PUSH | |
| SALESDETAIL(ORDER_ID, SHIPDATE, ORDER_AMOUNT), SHIPDATE>=1990/01/01 | - | ONCE PER 1 HOUR, PULL | 1002 |
| ... | ... | ... | |

Fig. 10 (B)

(B) SERVER REPLY

| SERVER REPLY | DATA RANGE | DATA QUALITY | DELIVERY METHOD | |
|---|---|---|---|---|
| ACCEPT | - | - | 13:00, PUSH | 1003 |
| ACCEPT | - | - | {1:00, 13:00}, PUSH | |
| CONDITIONALLY ACCEPT | SALESDETAIL(ORDER_ID, SHIPDATE, ORDER_AMOUNT), SHIPDATE>=1994/01/01 | - | ONCE PER 2 HOURS, PULL | 1004 |
| ... | ... | ... | ... | |

Fig. 15
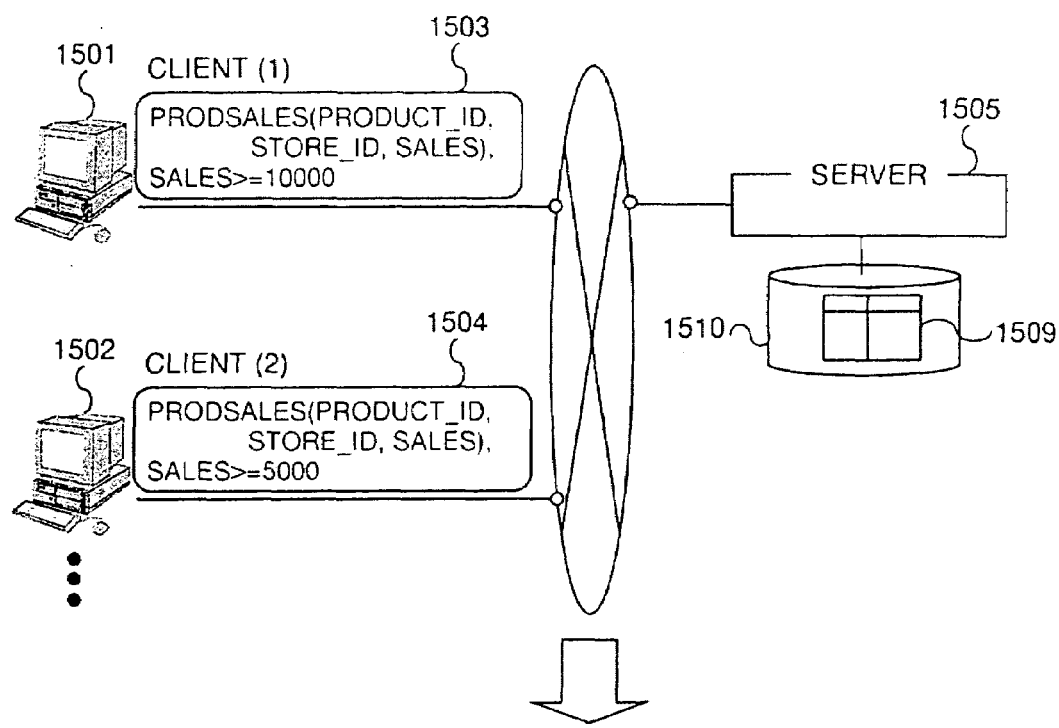
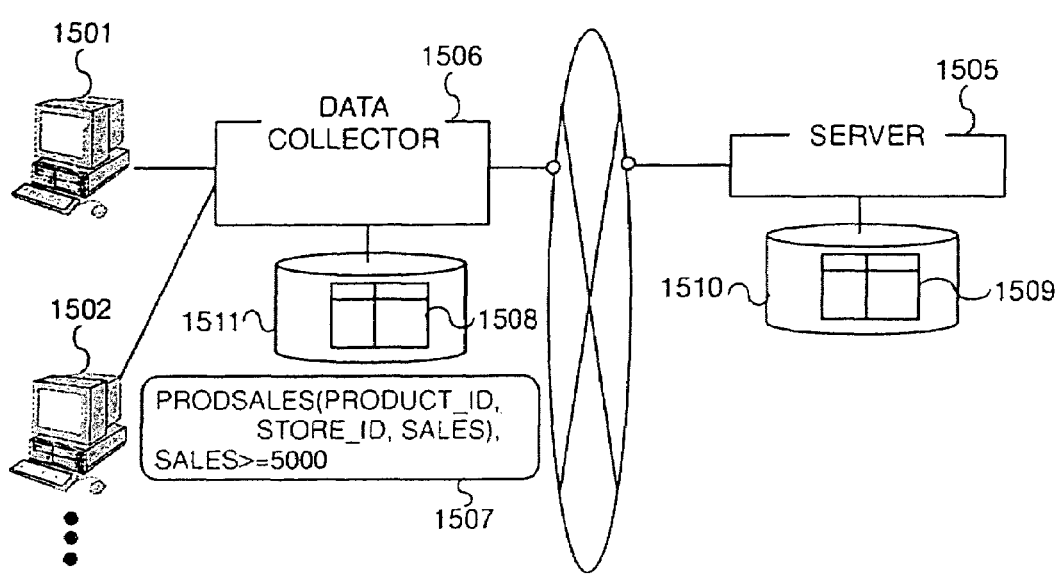

Fig. 17

DATA UPDATE FREQUENCY REDUCTION USING DATA FRESHNESS CONDITION

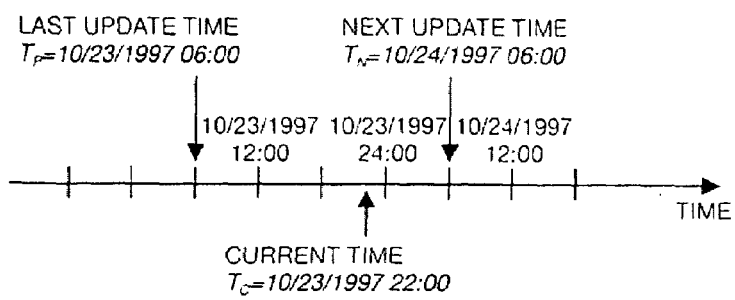

DATA FRESHNESS CONDITION: $T_F = 1$ day
$d_A(T_C) = d_A(T_P) \quad (T_C - T_P < T_F)$

Fig. 19

| DATA RANGE | DATA QUALITY | DELIVERY METHOD | |
|---|---|---|---|
| ORDER(ORDER_ID, PRICE, CUSTOMER_ID) PRICE>=20000 | - | ONCE BETWEEN 11:00 AND 15:00, PUSH | 1901 |
| ORDER(ORDER_ID, PRICE, CUSTOMER_ID), PRICE<=2000 | - | ONCE PER 1 DAY, PUSH | 1902 |
| ORDER(ORDER_ID, PRICE, CUSTOMER_ID), PRICE<=2000 | SAMPLE(ORDER, ORDER_ID, 10%) | ONCE BETWEEN 21:00 AND 23:00, PULL | |
| SALESDETAIL(ORDER_ID, SHIPDATE, ORDER_AMOUNT), SHIPDATE>=1990/01/01 | TOP-N(SALESDETAIL, ORDER_AMOUNT, 100) | ONCE PER 1 HOUR, PULL | |
| ... | ... | ... | |

DATA WAREHOUSE SYSTEM AND QUERY PROCESSING METHOD USED IN THE SYSTEM, AND DATA COLLECTING METHOD AND APPARATUS FOR THE METHOD, AND CHARGING METHOD AND APPARATUS IN THE SYSTEM

BACKGROUND OF THE INVENTION

The present invention relates to a data warehouse system of the type used in a distributed network computing environment (hereafter, to be referred to as a distributed environment) and a method for processing queries in the system; as well as, a method and an apparatus for collecting data for the query processings, and a method and an apparatus for charging each of the queries.

Now that lower cost computing systems have become widespread, highly reliable software programs have been developed for those systems, and more efficient social systems have been in demand to cope with such systems and programs, various types of information can be used on-line. For example, various business data including sales information of shops, products management information, and customers' information have come to be processed by computers in company activities. Recently, in order to meet the demand that such data handled in computers and used in the core operations in companies should also be used effectively for other purposes, for example, for sales trend researches of respective products, analysis of customers' interests, etc., the use of data warehouse systems has become very popular. How to compose and use such a data warehouse is described in, for example, "Building the Data Warehouse Second Edition" written by W. H. Inmon, John Wiley & Sons, Inc., ISBNo-471-1,4161-5, second chapter. A data warehouse, as the name represents, is used for storing and managing a mass of data for core operations in companies. Such data warehouses are coming into widespread use more and more.

In recent years, it has come to be understood that new and useful information, which has been neglected in the past, is available from data accumulated and managed in such data warehouses by analyzing the data from various new points of view. Thus, analysis of sales data in a super-market may reveal a relationship between two commodities that seem to have no relationship, for example, "A not insignificant number of men on the way to their home after work tend to buy diapers together with their canned/bottled beer on weekends". Based on this information, putting diapers near canned/bottled beers may significantly increase the sales of those items. Such a method for finding useful information from available data that has been neglected is referred to as data mining.

Along with the widespread use of computers, the progress of network techniques represented by the Internet is also remarkable. One of such network techniques is described in, for example, "Client/Server Programming with JAVA and CORBA Second Edition" written by Robert Orfali and Dan Harkey and published by John Wiley & Sons, Inc., ISBN0-471-24578-X (first chapter). According to the network technique, various types of information can be used now through networks using the distributed frameworks represented by CORBA (Common Object Request Broker Architecture). This trend is now making rapid progress.

Under such circumstances, it would be natural for an attempt to be made for obtaining useful information with the good use of such a method as data mining, thereby integrating data in databases and warehouses existing on networks.

A method for making an integrated access to data bases is described in, for example, "Federated Database Systems for Managing Distributed, Heterogeneous, and Autonomous Database" written by A. Sheth and J. Larson and published by ACM Computer Surveys, Vol. 22, No.3, pp. 183–236 and "Multidatabase Interdependencies in Industry" written by A. Sheth and G. Karabatis and published by Proc. of 1993 ACM Sigmod, Vol.22, pp. 483–486, etc. As described in the above publishings, conventionally, studies of heterogeneous databases, federated databases, multi-databases, etc. have been popular mainly in learned societies and many methods for integrating at least two databases have been discussed. Most of those methods, however, have been focused only on how to integrate heterogeneous data taking the heterogeneity among data into consideration.

If an attempt is made to build a data warehouse system in a distributed environment, therefore, the attempt will be confronted with many performance problems because of the mass of data which has to be handled, and because more complicated queries to those data warehouses are needed than the conventional database retrieval processings. As for the amount of data to be handled, a data warehouse of several TB (tera bytes: $10^{12}$ bytes) has already been built as of March 1998. A preferred example of such a complicated query processing is described in "TPC BENCHMARK D (Decision Support) Standard Specification" (Revision 1.2.2, Transaction Processing Performance Council). The benchmark is widely accepted in the concerned fields because it is a typical model of complicated data mining queries in a data warehouse. For example, if a series of the TPC-D queries are issued for a mass of data (1 TB), it will take a long time, such as from several tens of minutes to a few hours, even when the fastest computer in the world as of May of 1998 is used.

A general usage type of a data warehouse system is, as shown in FIG. 11, a client server type in which data is accumulated and managed in a storage unit 1105, and in which a client 1101 asks a server 1102 for a query processing, the client 1101 receives the processing result.

For the usage of a client server type data warehouse system in a distributed environment, however, a large number of clients of diverse characteristics 1401 to 1402 may query the servers 1403 to 1405 of an unspecified number of data warehouses and databases, etc. via a network 1405 and obtain the result (1407) as shown in FIG. 14. It will thus be expected that the processing of an analysis request from a client will be delayed. This is because the server's capacity cannot cope with complicated query processings as described above in response to a large number of requests from clients.

To analyze data in a plurality of servers, the following method is usually used. At first, a module 1202 as shown in FIG. 12 is built as an extension of a client server type data warehouse system. The module 1202 transfers a query 1207 from a client 1201 to servers 1205 to 1206 via a network 1204 with the use of the server location information 1203, and then the processing result 1208 is sent back to the client 1201. For example, the Virtual Data Warehouse System (VDW) of INTERSOLV Co., Inc. is one of the preferred examples using such a method. Because a VDW manages server locations, a client can handle the data in those servers without knowing them. In this case, however, just like the client server type data warehouse system in the distributed environment described above, it would be difficult to accept the VDW as a preferred example of data warehouse systems in such a distributed environment, because each server in the system is overloaded when in processing queries from many clients.

The Japanese Patent laid-Open publication No.8286960 discloses a method for processing queries to a plurality of databases or data warehouses in a distributed environment. According to this method, queries are transferred to cluster servers, thereby reducing the processing load of each server. Each cluster server then transfers a query to a proper database according to the query content and integrates the results from the database and sends it back to the client. In this method, because queries are transferred to servers after all, it is impossible to reduce the load of each server.

As for reducing the server's load and shortening the processing time, there is also another method as shown in FIG. 13, for example. According to this method, data items 1307 to 1308 are copied from the servers 1305 to 1306 into the module 1309 at the client side (steps 1311 and 1312) and a query 1313 is issued for the copy 1310 so as to obtain the result 1314. Hereafter, the copy 1310 of the data in this server will be referred to as a replica. If query processing is executed for a replica, query processings in the servers 1305 to 1306 can be avoided, thereby the load of each server can be reduced. In addition, accesses to the servers via a network can also be avoided, thereby the query processing time can be shortened.

In spite of this, if a simple copy method is employed to create replicas from a plurality of servers in a distributed environment, a large scale storage unit 1315 is indispensable for storing those replicas at each client side. For example, if a client tries to integrate 10 servers, each of which has about 300 GB (giga bytes: $10^9$ bytes), the user must also provide a storage unit of 3 TB (3 00 GB×10 servers in a simple calculation), and so the present technique will not actually be effective to prepare such a large scale storage unit at the client side. In addition, because a mass of data is transferred from a server to the client via a network when a replica is created, this will increase the load on the network significantly. If the data in the server is updated after a replica is created, the replica that was created by using the server's data must also be updated; and, thereby the cost of the updating will also be increased to an extent which cannot be disregarded, since this updating cost is proportional to the size of the replica. This method will not be a preferred example for data warehouse systems in a distributed environment.

On the other hand, there is another method proposed for reducing the load of each server and for shortening the query processing time by caching queries and the processing results so that the cached results are reused for new queries. The method is disclosed in "A Predicate-based Caching Scheme for Client-Server Database Architectures" written by A. Keller and J. Basu" (The VLDB Journal, Vol. 5, No.1, pp. 35–47). This method is effective to reduce the load of each server and shorten the query processing time if the reusage rate of query processing results is high. Yet, the ratio between the object data amount and the scale of the storage unit prepared by a client is too large to improve the reusage rate of the cached data of each data warehouse system in the distributed environment.

The Japanese Patent laid-Open publication No.9297702 discloses an information processing apparatus/system, as well as a controlling method used respectively for getting files from servers via a network and supply the files to users. This method, however, will not be able to shorten the response time to the first query from a client. This is because the system creates a replica when receiving a file reference request from a user and if a query is issued from the user, the searching must be directed to a server at first. In addition, because this method creates a replica for each file, it is difficult to create a replica for each record or an object matching with the query condition of a database.

There are two methods for propagating updating of data in a server to each client (corresponding to the data collector to be described later in accordance with this invention), i.e., the push method controlled by each server and the pull method controlled by each client. In the push method, each server transmits data to each client at fixed intervals (for example, every hour) or each time the data in each server is updated. In the pull method, each client accesses a server and obtains data from the server at fixed intervals or as needed. The push method in which data is delivered to respective clients has been a problem in that the load of each server is increased. In the push method, in which each server sends the data by broadcast or multicast, and only the clients that need the object data receive it, a problem also arises in that it is difficult for each client to obtain data at a proper timing. Therefore, when only the push method is employed, it is difficult to deliver data efficiently in a distributed environment. On the other hand, in the case of the pull method, in the case when data in a server is updated, the client data is also updated immediately, so that each client must check the data in the server frequently. Accordingly, in a server in which many clients issue processing requests frequently, the load of the server for processing those requests rises too high to cope with them. It will thus be found that it is difficult to deliver data efficiently only with the use of the pull method in a distributed environment. A combination usage of the push and pull methods is described in "Update Monitoring: The CQ Project" written by C. Pu and L. Liu (Lecture Notes in Computer Science, Vol. 1368, ISSN 0302–9743, pp. 396–411 (hereafter, to be referred to as CQ). In this CQ project, each query including a trigger condition from a client is registered in the CQ server and data is transferred with the pull method at first under the control of the client, but the push method is used for the second time and after under the control of the server according to the trigger condition included in the query. The CQ project cannot specify the push and pull methods for each query, so that the push method has come to be used for transferring data after all under the control of the server. Thus, the method cannot avoid a problem of an increase of the load of the server.

In the case of a method for transferring queries to each server, if a large number of clients try to access many servers including databases, data warehouses, etc. through a network so as to get useful information with the use of integrated data in those servers, then the method is confronted with a problem that each of those servers is overloaded. Significant dependency of the method on the network and an increase of the response time to each query have also been other problems. The method of creating replicas at each client side has been confronted with such problems as an increase of the load on the network due to the transfer of a mass of data, an increase of the capacity of the storage unit at the client side, and an increase of the updating cost of replicas. In addition, in the case of a method for using a cache, the method has been confronted with such problems as reduction of the reusability of cached data. This is why it has been difficult to build data warehouse systems efficiently in a distributed environment.

SUMMARY OF THE INVENTION

Under the circumstances, it is an object of the present invention to provide an efficient data warehouse system in a distributed environment, a method for processing queries, and a method and an apparatus for collecting data for such query processings.

More concretely, it is a first object of the present invention to reduce the load of each server and a second object to reduce the dependency of the query processing on the network. It is a third object to shorten the time of response to each query, and a fourth object to reduce the load the network. It is a fifth object to reduce the storage capacity of each client, a sixth object to reduce the updating cost of each replica, and a seventh object to improve the hit ratio of each replica.

In order to achieve the first to third objects described above, the present invention provides a data warehouse system having a data collector for creating/managing replicas of the data in a server used for processing queries from clients, so that those replicas created in the data collector are used as much as possible for processing queries from clients. Because the data collector processes queries in such a way, less queries are transferred to the server, thereby the reduction of the load applied on the server, which is the first object, can be achieved. Furthermore, because the data collector can also create replicas of data in the server, those replicas created in the data collector can be used for processing queries from clients when the network connected to the server goes down, thereby the reduction of the dependency of query processings on the network, which is the second object, can be achieved. Furthermore, because the data collector can also use the replicas of only the minimum necessary data for processing queries from a limited number of clients and processes no query in the server, the shortening of the response time to each query, which is the third object, can be achieved. To achieve this third object, query processings in the server are avoided especially to prevent the server from an increase of the load to be caused by accesses from many clients and management of a mass of data, which result in high costs for processing those many queries.

More concretely, according to the present invention, each query is processed as follows. The data collector decides if it is possible to process a query from a client itself or whether the query should be processed in another cooperative data collector or whether it should be transferred to a server. If the data collector itself or another cooperative data collector can process the query, the data collector will process the query. With such use of other cooperative data collectors, many queries can be processed in those data collectors, thereby the first to third objects can be achieved. Furthermore, because only some of the queries, which cannot be processed by the data collector and any other cooperative data collectors, are transferred to a server, the amount of data to be processed in the server becomes less, thereby the load on the server can be reduced and less result data is sent back from the server to clients. The reduction of the load on the object network, which is the fourth object, can thus be achieved.

Furthermore, in order to solve the problems which arise when replicas are simply created and to achieve the fourth to sixth objects, the data collector is associated with other data collectors as needed, so that clients who can share data are grouped and replicas are created for such a group of clients and the replicas are shared among those clients in the group. Because each replica is shared by clients in such a way, the amount of data to be transferred from the server to the data collector is reduced, thereby the load of the network is reduced. According to the present invention, the data collector creates replicas. Thus, it is possible to reduce the capacity of the storage unit required by each client, which is the fifth object, as well as to reduce the capacity of the storage unit required by the data collector through sharing of replicas among data collectors. Furthermore, because replicas are shared among data collectors, the number of replicas in the whole system can be reduced, thereby the reduction of the updating cost, which is the sixth object, can also be achieved.

A replica can be created so as to satisfy part or the whole of each replica creation request as follows. At first, the data collector accepts a replica creation request from a client. The request includes conditions such as the data quality, the precision, freshness, and priority of the data given from a user through the client, as well as the condition of the data collecting range. The data collector then holds the request. After that, the data collector negotiates with a server which supplies the object data considering the values of available resources, such as the storage unit capacity, the CPU performance, etc., thereby creating a replica which satisfies part or the whole of the replica creation request. Because a replica creation request is given from each user, it is possible to collect the data wanted by the user, thereby the hit ratio of each replica can be improved to achieve the seventh object. Furthermore, because the data quality is adjusted when each replica is created, it is possible to create the object replica in a proper size according to the computer resources available for the data collector, thereby the reduction of the load on the object network, which is the fourth object, can be achieved and the reduction of the capacity of the storage unit of each client and the data collector, which is the fifth object, can be achieved. In addition, the reduction of the updating cost for each replica, which is the sixth object, can be achieved.

When in updating a replica, the pull method controlled by each client and the pushing method controlled by each server are combined so as to reduce the load on the server while considering the request of each client for data. The load of the server when updating a replica, which is the first object, can thus be reduced.

BRIEF DESCRIPTION OF THE DRAWINGS

FIG. 5 is a flowchart of an updating procedure.

FIG. 6 is a chart which shows a replica creation request issued from a client in an embodiment of the present invention.

FIG. 7 is a chart which shows a method for adjusting the precision in accordance with each data type in an embodiment of the present invention.

FIG. 8 is a chart which shows a replica management table in an embodiment of the present invention.

FIG. 9 is a chart which shows delivered data and updated data in an embodiment of the present invention.

FIGS. 10(A) and 10(B) are charts which show information used in a negotiating processing in an embodiment of the present invention.

FIG. 15 is a diagram which shows an example of how to group a plurality of clients in a data collector in accordance with the present invention.

FIG. 17 is a diagram which shows how to use the freshness condition in an embodiment of the present invention.

FIG. 19 is a table which shows an example of a replica creation request in accordance with the present invention.

DETAILED DESCRIPTION OF THE PREFERRED EMBODIMENTS

Figure 1:
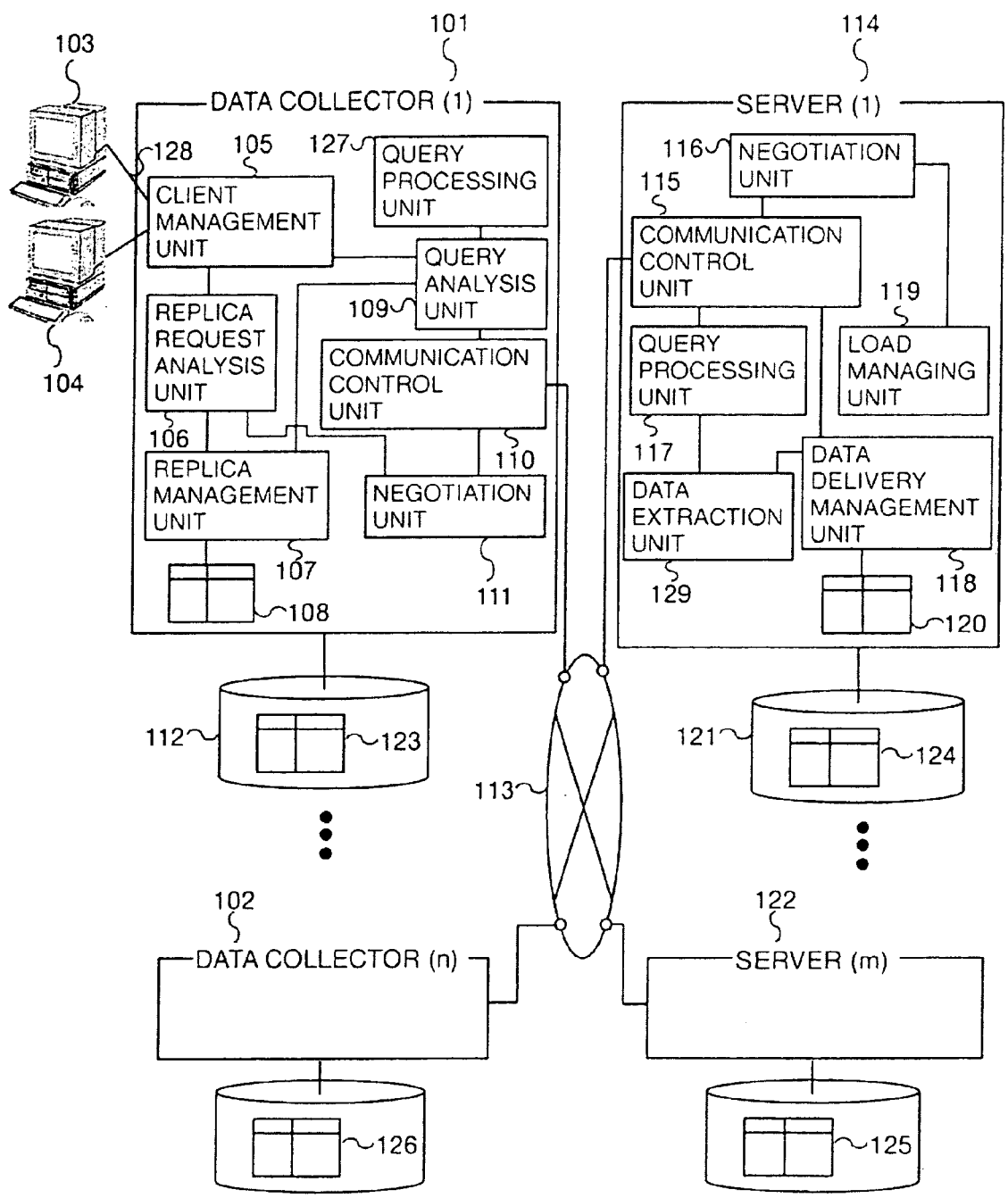
FIG. 1 is a block diagram of a data warehouse system representing a first embodiment of the present invention.

FIG. 1 shows a preferred embodiment of a data warehouse system in accordance with the present invention. Clients 103 and 104 are connected to a data collector 1 (101) via an intra-network 128.

The intra-network 128 may be a local area network (LAN) connected through the Ethernet, optical fibers, and an FDDI. The clients 103 and 104 may be any computer systems such as personal computers including the Hitachi FLOPA, and Hitachi 3050 creative work stations. The data collector 1 includes a client management unit 105 which groups and manages a plurality of clients and accepts replica creation requests and queries from the clients and transfers replica creation requests to a replica creation request analysis unit 106 and queries to a query analysis unit 109; a replica creation request analysis unit 106 which decides whether to create a replica actually in response to a replica creation request from a client, then transfers the replica description, which is information related to the created replica, to a replica creating management unit 107 if it is decided to create the replica; a replica creating management unit 107 which stores and manages replicas 123 in a storage unit 112; a query analysis unit 109 which analyzes each query from each client; a query processing unit 127 which processes each query from each client if the data collector can processes it; and a communication control unit 110 which manages communications with servers and other data collectors via the network 113. The data collector 1 may also be provided with a data collector negotiation unit 111 so as to cope with higher level processings. The data collector negotiation unit 111 will be described in detail later. The data collector may also be any computer system just like a client. The storage unit 112 may be any of a magnetic storage unit, an optical disk unit, and a magnetic tape unit. The network 113 may be a local area network (LAN) as described above.

The server 1 (114) includes a communication control unit 115 which accepts replica creation requests and queries from a data collector; a query processing unit 117 which processes queries; a delivery data management unit 118 which manages data to be delivered to the data collector; and a delivery data management table 120 referenced by the delivery data management unit 118. The server 1 may also be provided with a server negotiation unit 116 and a load management unit 119 so as to cope with higher level processings. Those items 116 and 119 will be described in detail later. The server 1 may also be any computer system just like the data collector. The storage unit 121 for storing server data 124 may also be any of a magnetic storage unit, an optical disk unit, a magnetic tape unit, a CD-ROM, etc., or a combination of those devices. Furthermore, the management of server data and replica data performed by the data collector may be performed by a file system or a database management system such as HITACHI HiRDB, etc.

The client management unit, the replica creation request analysis unit, the replica creating management unit, the query processing unit, the communication control unit, and the data collector negotiation unit provided for the data collector, as well as the communication control unit, the query processing unit, the server negotiation unit, the load management unit, and the delivery data management unit provided for the server may be all composed of dedicated hardware. They may also be programs stored locally in the storage unit provided in the server or downloaded from a server which stores network programs. A program downloaded safely from a server in a heterogeneous distributed environment can be executed with the use of a programming language (hereafter, to be referred to as an Internet programming language) as described in, for example, "The Java Tutorial" written by Mary Compione and Kathy Walrath" (Addition-Wesley, ISBN 0-201-63454-6, chapter 4).

In particular, a preferred embodiment of a client may use a web browser program, such as the Internet Explorer of Microsoft Inc. or Netscape Navigator of Netscape Inc., to run on such a personal computer as Hitachi FLORA, any computer system such as a Hitachi 3050 creative work station, etc. In this case, however, any client program can be changed dynamically by down-loading a program module created with the use of the Internet programming language into the browser.

Figure 18:
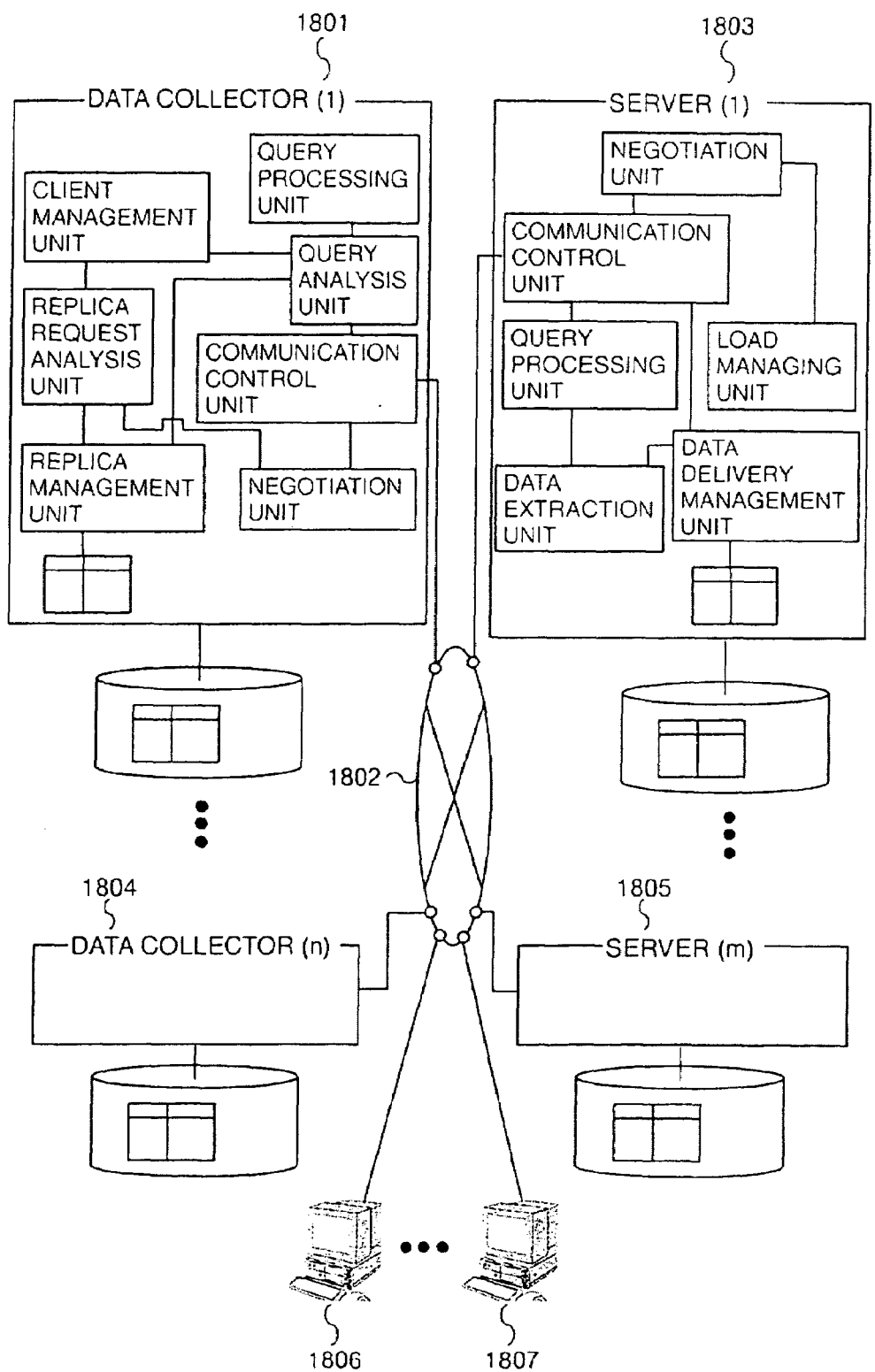
FIG. 18 is a block diagram of a data warehouse system in the second embodiment of the present invention.

Although clients are connected to the data collector (1 to n) directly via an intra-network in this embodiment, the present invention is also effective for a case as shown in FIG. 18, in which clients are connected to a data collector via a LAN and the Internet.

More concretely, the present invention is characterized by the following five points. (1) A partial replica is created in a data collector so that a group of clients can share the replica. (2) A replica is created as follows. At first a replica creation request is received from a user, then the data used to create an actual replica is determined through negotiation with the server, and the data is described as a replica description for management. (3) The replica creation request includes not only a condition to decide the object data range (data region condition), but also a condition to decide data quality (data quality condition). (4) A delivery data management table held at the server side is used to update the replica and is transferred using a method obtained by combining a pushing method controlled by the server and a pulling method controlled by the client. (5) In principle, queries are processed by its own data collector and queries which cannot be processed by its own data collector are processed by another data collector or the queries are transferred to a server so as to be processed there. Hereafter, each of those five characteristic points will be described in detail.

Figure 14:
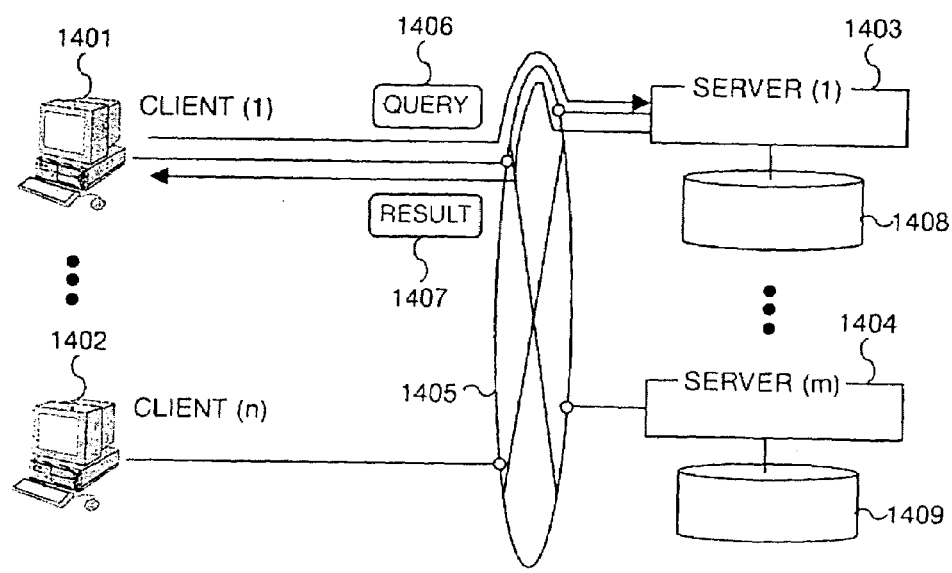
FIG. 14 is a diagram which shows how to form a conventional configuration in which multiple clients correspond to multiple servers in a distributed environment.
Figure 16:
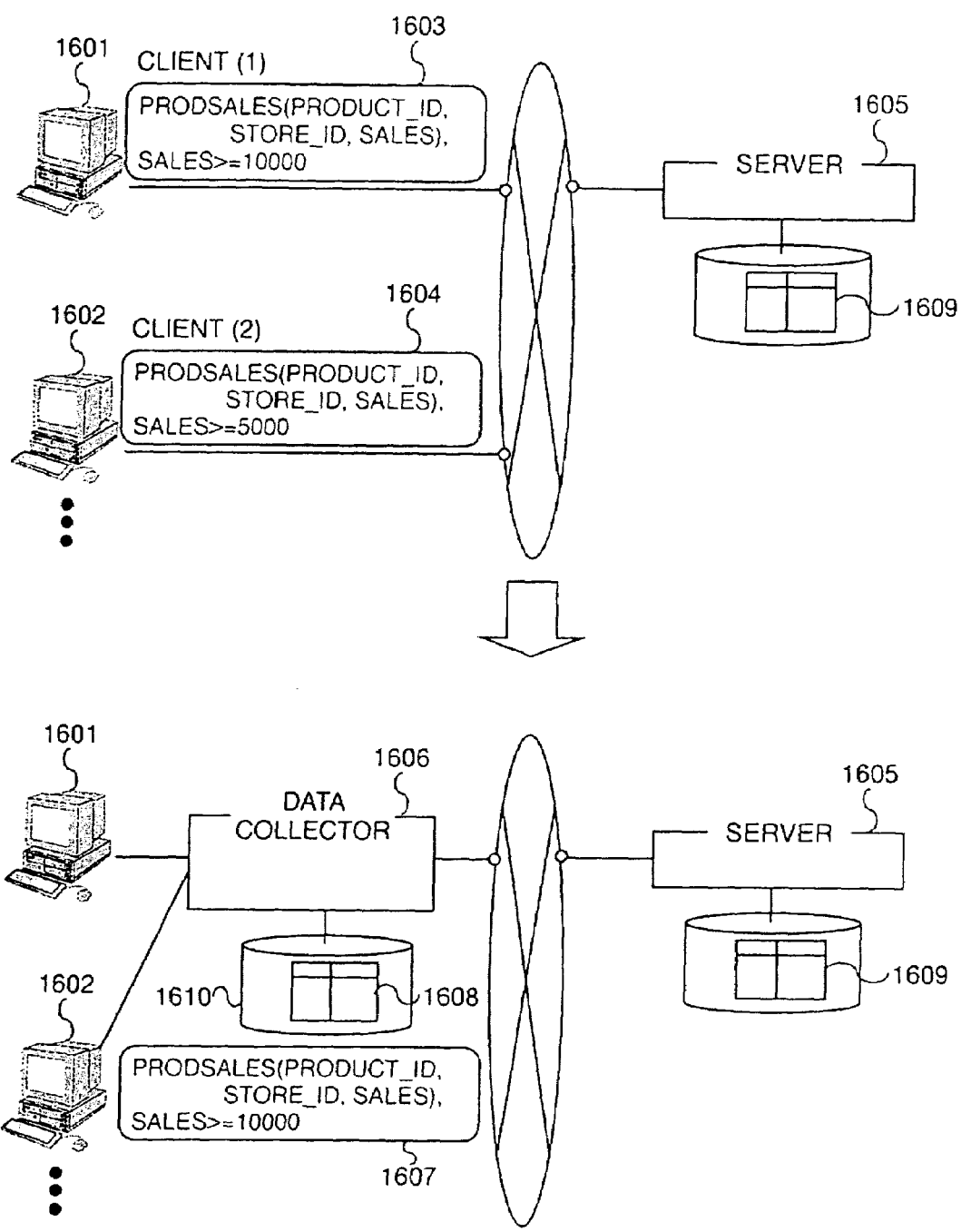
FIG. 16 is a diagram which shows another example of grouping a plurality of clients in a data collector in accordance with the present invention.

(1) As described above, it is difficult to realize data warehouses in a distributed environment using the conventional techniques as long as a simple client-server system as shown in FIG. 14 is employed. In the case of the present invention, therefore, the data warehouse system is provided with a data collector for managing clients which can share data as a group. The use of this data collector makes it possible to suppress creation of redundant replicas to be duplicated at the client side so as to prevent useless accesses to a server. The load of the server can thus be reduced. For example, in FIG. 15, the client 1 (1501) needs the data (1503) exceeding ¥10,000 in the sales table and the client 2 (1502) needs the data (1504) exceeding ¥5,000 in the sales table. If the sales data 1509 is stored in the server 1505, both of the clients 1 and 2 must get the data from the server 1505 respectively. In other words, the server 1505 is loaded by the queries from both of the clients 1 and 2. On the other hand, if the data collector of the present invention is installed so as to hold the replica creation requests from the clients 1 and 2 and create a replica 1508 with "the data exceeding the sales of ¥5,000" (1507), which is a union of the conditions, employed as a replica description, and obtained from the server, then the queries from the clients 1 and 2 can be processed with the use of the data in the data collector. It is thus possible to reduce the accesses of the clients 1 and 2 to the server 1305, as well as to reduce the load of the server and the load of the network to be increased by data transfer. If it is impossible for the data collector to hold the union of replica creation requests from the clients 1 and 2 due to the limit in the capacity of the storage unit 1610 of the data collector itself, the limit of the performance of the CPU of the data collector 1606, or the limit of the data amount to be transferred in the network, then "the sales data exceeding ¥10,000" (1607) is obtained from the server as a replica description for each of the replica creation requests (1603 and 1604) of the clients 1 and 2 (1601 and 1602) as shown in FIG. 16. Replicas can thus be created properly. The "sales data exceeding ¥10,000" is an intersection of the conditions of the replica creation requests from the clients 1 and 2. It is thus possible to process all the processing requests with the use of replicas if the processing request from the client 1 can satisfy the replica creation request. In the same way, for the client 2, it is only needed to transfer queries which cannot be processed with the use of replicas, that is, the queries which reference "the sales data between ¥5,000 to ¥10,000" to the server, thereby the load of the server, as well as the load of the network can be reduced. It is thus clear that the effect of the load reduction for both server and network is increased in proportion to the increase of the number of clients.

Figure 2:
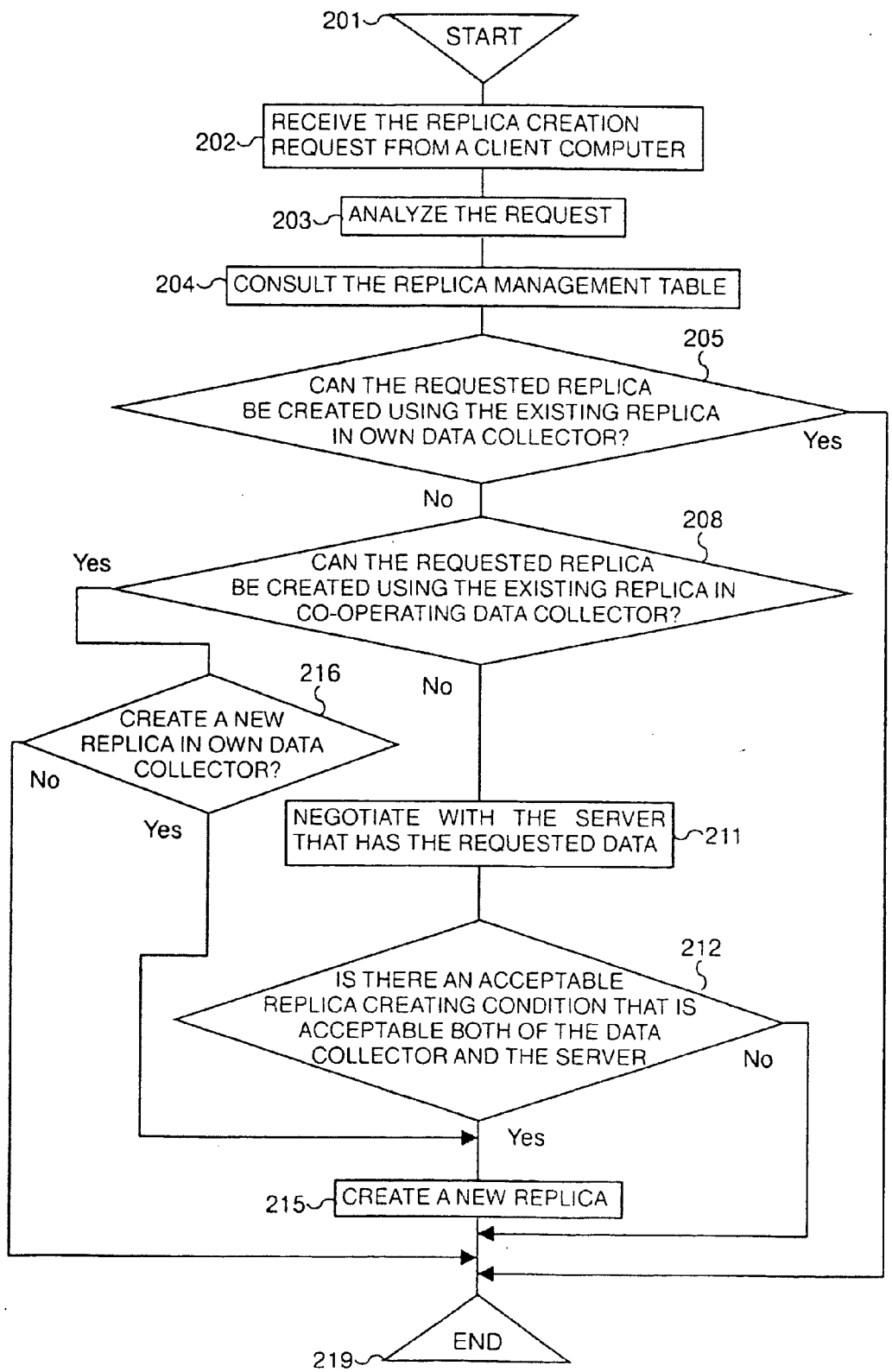
FIG. 2 is a flowchart of a replica creating procedure.

(2) Hereunder, how a replica creation request is accepted and how a replica is created will be described with reference to FIGS. 2 and 8. If the data collector 101 accepts a replica creation request (the replica creation request will be described in (3)) from the client 103 or 104 (step 202), the replica creation request analysis unit 106 analyzes the request (step 203) and references to the replica management table 108 shown in FIG. 8 through the communication with the replica creating management unit 107 (step 204). The replica management table 108 includes a data region condition 801 related to the region of the data to be created and a data quality condition 802 related to the quality of the data. These two entries are referred to as a replica description 803 respectively. One replica description entry consists of replica location information 804 which describes the name of a data collector in which the replica is stored, server location information 805 which describes the name of a server from which the data of the replica is output, and a data delivery condition 806 which is a maintenance condition of the replica. For example, the first entry, 807 in FIG. 8 indicates that the replica of the data which fetches the three columns of the order number, the price, and the customer number of each record exceeding ¥10,000 among the records is stored in the data collector 1 and the source data of the replica is stored in the server 1, the data is delivered from the server 1 with the use of a pushing method at 13:00, and a maintenance process is applied to the replica. The {1:00, 13:00} "PUSH" described for the data delivery method in the second entry in FIG. 8 indicates that data is delivered at 1:00 and 13:00 with the use of a push method.

If a requested replica can be created from an existing replica in its own data collector (if Yes is selected in the decision processing 205), then the replica creating is ended without creating any new replica. For example, if the replica management table is as shown in FIG. 8 and the new replica creation request is the first entry 190 shown in FIG. 19, then the replica creation request can be processed with the use of the existing replica in the data collector 1, shown as 807 in FIG. 8 and Yes is selected for the decision processing 205.

If a requested replica cannot be created from the existing replica 123 stored in its own data collector (if No is selected in the decision step 205), it is decided whether or not the requested replica can be created from a replica 126 stored in any cooperative data collector 102 (decision step 208). If possible (if Yes is selected in the decision step 208), then it is further decided whether to create another replica in its own data collector (decision step 216). If no duplicated replica is created in its own data collector (if No is selected in the decision step 216), the replica creating is ended without creating any further replica. If a duplicated replica is created in its own data collector (if Yes is selected in the decision step 216), then the replica is created from the replica stored in a cooperative data collector 102 on the condition requested from the client (step 215), then the replica creation is ended (step 219).

For example, If the replica management table is as shown in FIG. 8 and a new replace creation request is the second entry 1902 shown in FIG. 19, then the new replica creation request cannot be processed with any existing replica stored in the data collector 1. However, the request can be processed with the use of the replica stored in the data collector 2. In such a case, if the storage unit of the data collector 2 has a capacity sufficient for creating the new replica, then the new replica is created in the data collector 1 from the replica stored in the data collector 2. If the data collector 1 receives a replica creation request from a client and the priority of the replica is higher than that of the existing replica stored in the data collector 1, the existing replica is erased, and then the replica with the higher priority is created in the data collection means 1 in accordance with the replica creation request.

To decide whether or not it is possible to create a replica from an existing replica for a new replica creation request, the replica management table which describes the content of the existing replica is compared with the new replica creation request. More concretely, the data collector holds the replica creation request, and, if the data collector receives a new replica creation request for the replica description created according to a combination of the replica creation request set and the replica creation request, then the data collector holds the replica creation request and compares the request with an entry in the replica management table, thereby determining the relationship between conditions for whether the value is set in both of the conditions or one condition includes the other. For example, if a new replica creation request shown in FIG. 19 is output to each entry in the replica management table shown in FIG. 8 in the preceding embodiment, then it would be clear that the new replica creation request represented by the entry 1902 is included in the existing replica represented by the entry 808. In this embodiment, a very simple replica creation request is picked up as an example, but the replica management which uses the replica management table of the present invention can also apply to further general cases with the use of a method referred to as "Query Equivalence, Query Containment" disclosed in, for example, "PRINCIPLES OF DATABASE AND KNOWLEDGE-BASE SYSTEMS" written by Jeffrey D. Ullman (volume II, Computer Science Press, ISBN 0-7167-8162-X, Chapter 14) and "Optimization for Conjunctive Queries", which discloses the relationship between conditions for whether both conditions take the same value or one condition includes the other.

If it is impossible to create a replica requested from a client from any of the existing replicas stored in its own data collector and the existing replicas in the cooperative data collectors (if No is selected in the decision step 208), then a negotiation with the server is made (step 211) If it is found as a result of the negotiation that there is no condition to be agreed upon by both data collector and server for creating the replica (if No is selected in the decision step 212), then the replica creation is ended without creating any replica (step 219). If it is found as a result of the negotiation that there is a condition to be agreed by both for creating the replica (if Yes is selected in the decision step 212), then the replica is created in accordance with the replica creation condition (step 215), and the replica creation is ended (step 219).

Figure 3:
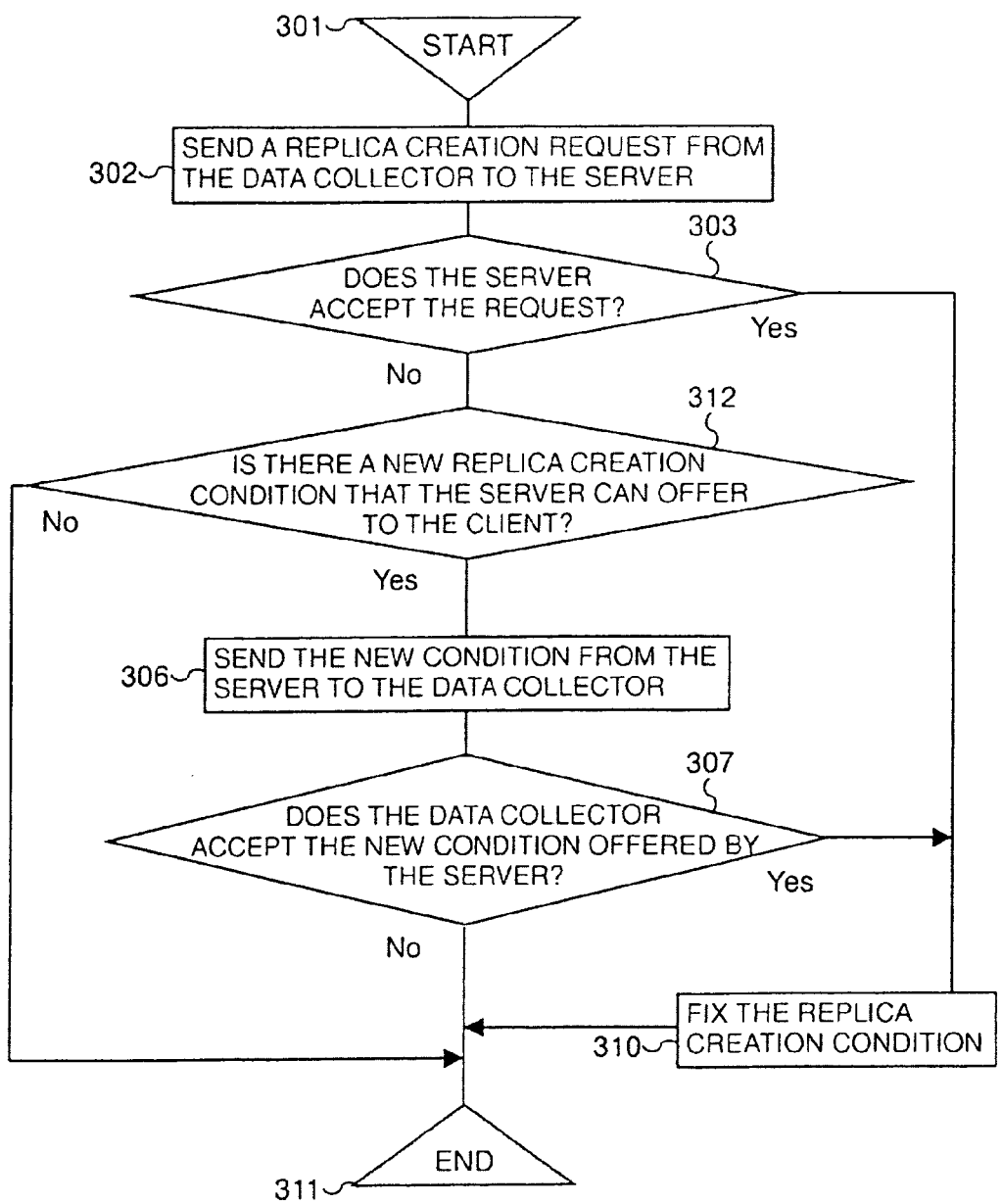
FIG. 3 is a flowchart of a negotiating procedure.

Hereunder, the negotiation processing in step 211 will be described in detail with reference to FIGS. 1 and 3. At first, a replica creation request is transferred from the data collector 101 to the server 114 (step 302). Then, if the server accepts the request (if Yes is selected in the decision step 303), the replica creation request (a rate in a accounting system) is defined as a condition for creating the replica requested by the data collector (step 310), then the replica creation management unit 107 of the data collector updates the replica management table 108 and the delivery data management unit 118 of the server updates the delivery data management table 120 according to the created condition, and the negotiation processing is ended (step 311). If there is no new condition to be presented to the data collector from the server (if No is selected in the decision step 312) when the replica creation request transferred from the data collector cannot be accepted (if No is selected in the decision step 303), the negotiation processing is ended without setting any information related to the replica creation request (step 311). If there is a new condition presented by the server to the data collector (if Yes is selected in the decision step 312) when the server cannot accept a replica creation request transferred from the data collector (when No is selected in the decision step 303), then the server transfers the new condition to the data collector (step 306). If the data collector accepts the condition presented by the server (if Yes is selected in the decision step 307), then the replica management table of the data collector and the delivery data management table of the server are updated according to the new condition defined as a replica creation condition (step 310), then the negotiation processing is ended (step 311). If the data collector cannot accept the condition presented by the server (if No is selected in the decision step 307), then the negotiation processing is ended without setting any information related to the replica creation request.

Hereunder, a negotiation processing will be described more in detail with reference to FIGS. 10(A) and 10(B). In this example, it is premised that the replica creation requests from the clients 103 and 104 are in accordance with the conditions as shown in FIG. 10(A). At first, the data collector 1 (101) transfers a replica creation request 1001 to the server 1 (114) via the network 113. The server 1 estimates the load to be applied on its own system when in accepting the replica creation request from the load of the current own-system managed by the load management unit 119. If the estimated value is under the threshold, the server 1 accepts the replica creation request and notifies the data collector of the response of acceptance (1003) and ends the negotiation. The replica creation request is thus defined as a replica creation condition. On the other hand, if the replica creation request 1002 is transferred to the server m(122) and it is found as a result of the load estimation that the server 1 cannot accept the replica creation request on the condition shown in the request 1002, but can accept the request on the new condition as shown in the request 1004, then the server m returns the response of acceptance and the new condition generated by the server 1 to the data collector 1. The data collector 1 then returns the new condition to the client 103 or 104 which has issued the replica creation request. If the client accepts the new condition, the server 1 updates the replica management table of the data collector and the delivery data management table of the server in accordance with the new condition defined as a replica creation condition, then ends the negotiation processing.

The load of the current own-system and the load of its own-system when the replica creation request is accepted are measured in the following embodiment. Generally, a multi-task operating system has a queue of executable processes, which is referred to as "a run queue". The time average of the average length of the queue is referred to as a load average. For example, the server regards the load average L of its own-system as the load of its own-system and estimates the load of its own-system as L+1 when the server 1 accepts the new replica creation request. If the estimated load is under the threshold $L_{MAX}$ (that is, $L+1 \leq L_{MAX}$), the server 1 accepts the replica creation request. if the server cannot estimate the load average, the average number of jobs N per a fixed time is regarded as the load of its own-system and the server 1 estimates the load of its own-system as N+1 when it accepts the replica creation request. Then, if the estimated value is under the threshold $N_{MAX}$ (that is, $N+1 \leq L_{MAX}$), the server 1 accepts the replica creation request.

(3) At first, a replica creation request will be described below. For example, in the embodiment shown in FIG. 15, the clients 1 and 2 collect and analyze sales data of goods. In the case of data mining, data to analyze is often limited for some reason, for example, a client wants to analyze only the sale data in Tokyo. This restriction is based on an intention of a user who wants to analyze data using a client. It is difficult for a computer to take this intention into consideration automatically at present and such a processing is often redundant. To avoid such a problem, therefore, the present invention provides each client with an interface which allows the user to give a replica creation request related to the data to access. The interface may be a data collector. Just like a server, the interface may be a program stored locally in the client 1501 or 1502 shown in FIG. 15 or a program down-loaded from a server which stores network programs. Thus, the replica 1508 to be shared by clients is created in the data collector 1506 in accordance with the replica creation request issued from the user using the interface of the client.

The replica creation request, as shown in FIG. 6, includes a data region condition (601) indicating a data range, a data quality condition (603) indicating the quality of data, and a data delivery condition (604) indicating a method for delivering data. The data quality condition also includes, for example, the data updated in the server, as well as a freshness condition 605, a precision condition 606, and a priority condition 607. The condition 605 indicates that data, which is not updated yet, received within one hour is regarded as the latest data in a replica. The condition 606 indicates that 10% samples corresponding to the order numbers in the order list are defined as replica data. The condition 607 indicates that the upper 10 data items in the order list are used with a precedence over others. In this case, however, it is premised on the fact that the replica creation request allows a notation which excludes the data quality condition taking the compatibility with the conventional query language.

It is also premised on the fact that if a client requests the latest data when the replica creation request does not include the freshness condition, the data in the server must be checked and if the replica creation request does not include the precision condition, the precision is 100% and if the replica creation request does not include the priority condition, the data in all orders are found. The precision condition, as shown in FIG. 7, may be defined according to the data type with the use of various methods such as sampling of data in related databases, extraction of each field, creation of a summary for text data, extraction of each keyword, lossless/lossy compression of still image data, extraction of each frame, reduction of colors, reduction of resolution, contraction in size, reduction of frames of dynamic picture image data, compression of picture image data in each frame, sound quality adjustment for voices, conversion to character data, etc.

The size of a replica can be reduced by having the data quality condition included in the replica creation request. An effective precision adjustment method is disclosed in the Japanese Patent Laid-Open publication No. 10-269248 "A Method for Executing data randomly in a Database Processing System". According to this method, a high precision can be estimated merely with small scale sampling of data, thereby it would be understood that precision adjustment is very effective for building data warehouse systems. In addition, using the freshness condition will makes it possible to flexibly solve the updating problem which has been discussed for a distributed system.

For example, as shown in FIG. 17, if the freshness validity is one day, the replica is updated last at 6:00 in October 1997 and the current time is 22:00 in October 1997. The data in the server may be updated actually during the time, but if the freshness validity is defined as one day, the current time data $D_A(T_C)$ can be regarded as the last updating time data $DA(TP)$, thereby transfer of the data in the server via the network each time the data in the server is updated is prevented. The load of the network can thus be reduced. of course, in the case where the data in the server is updated, the updating must affect the freshness validity and it is only needed to avoid specifying the freshness.

Furthermore, if the priority limit 607 as shown in FIG. 6 is applied, the amount of data to transfer can be reduced. This limit 607 specifies that the upper 10 prices in the order list are included in a replica. When compared with a case in which a replica of the whole order list is created, the transfer data amount can be significantly reduced.

(4) Hereunder, how the data delivery condition for updating a replica is updated will be described with reference to FIGS. 1 and 5. If the data 124 managed by the server 1 (114) is updated (step 502), the delivery data management unit 118 of the server references to the delivery data management table 120 (step 503) and if updated data is not registered in the delivery data management table (if No is selected in the decision step 504), the updating processing is ended without delivering data (step 506). If updated data is not registered in the delivery data management table (if Yes is selected in the decision step 504), the data corresponding to the destination is delivered according to the data delivery condition of the delivery management table (step 505), then the updating processing is ended.

Next, how a replica is updated will be described in detail with reference to FIGS. 1 and 9. The server 1 (114) stores order list data 124 in its storage unit 121. In this case, it is premised that new order data 907 is entered to the order list. The delivery data management unit 118 correlates the updated data with the data in the delivery data management table. Because the updated data satisfies the entries 905 and 906 of the delivery data management table, the delivery data management unit 118 delivers the updated data to the data collector 1 at 13:00 according to the entry 905 using a pushing method controlled by the server and to the data collector 2 at 1:00 and 13:00 according to the entry 906 using a pushing method controlled by the server. When effecting delivery of data at 13:00, the server 1 can deliver data collectively to the data collector 1 and 2 through multicasting, so the load of the server, as well as the load of the network can be reduced. Furthermore, if the data delivery condition in the entry 906 includes a data delivery condition of the entry 905 for delivering data once between 11:00 and 15:00 or once a day, then the number of data transfers can be reduced by adjusting the data transfer in the entry 906 to the data transfer in the entry 905.

Figure 4:
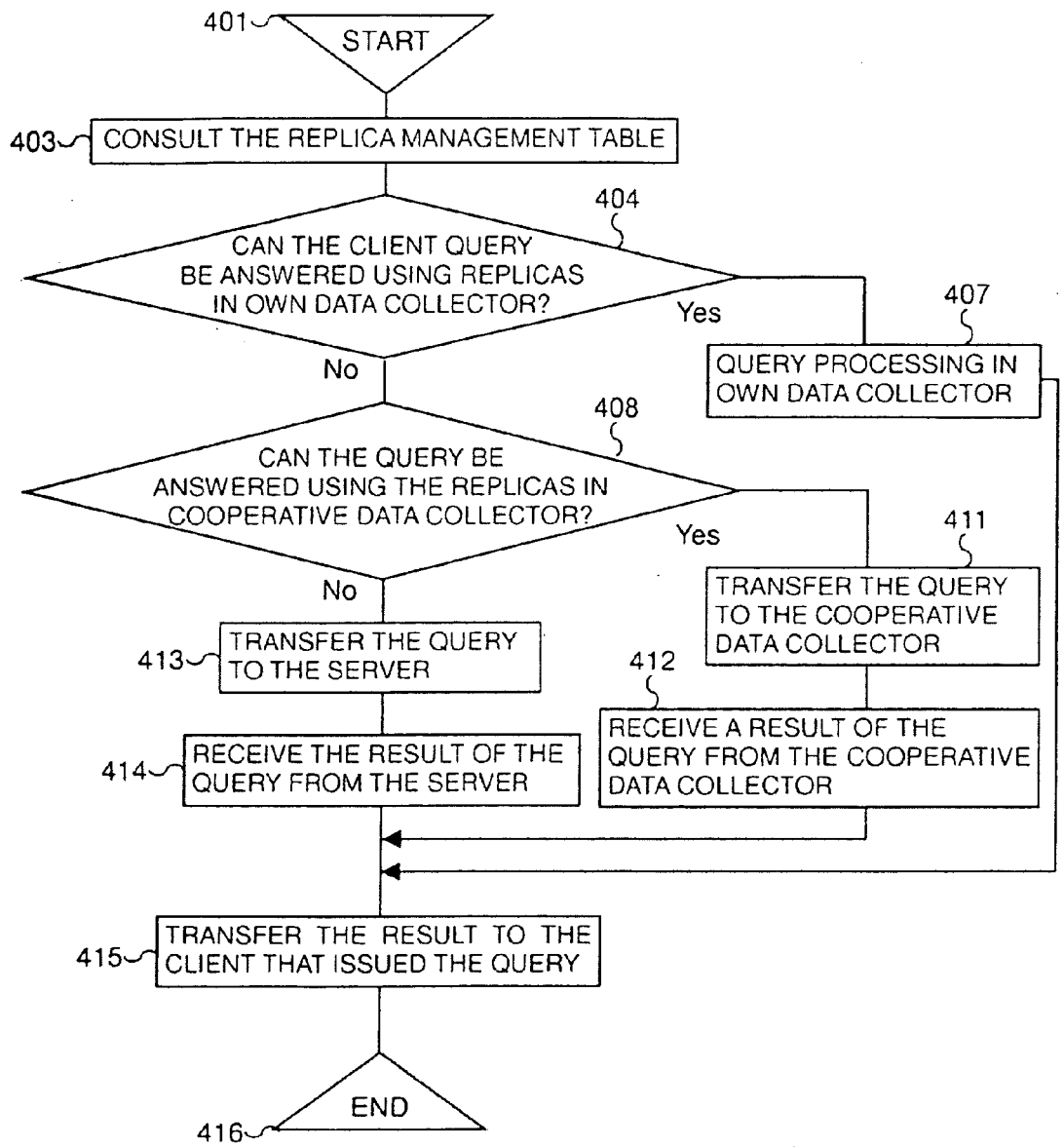
FIG. 4 is a flowchart of a query processing procedure.
Figure 11:
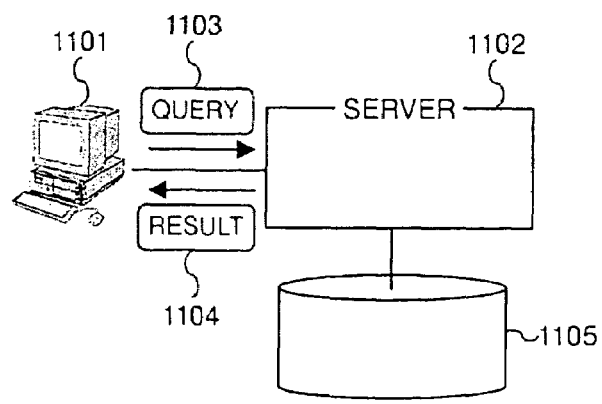
FIG. 11 is a diagram which shows how to use a conventional data warehouse.
Figure 12:
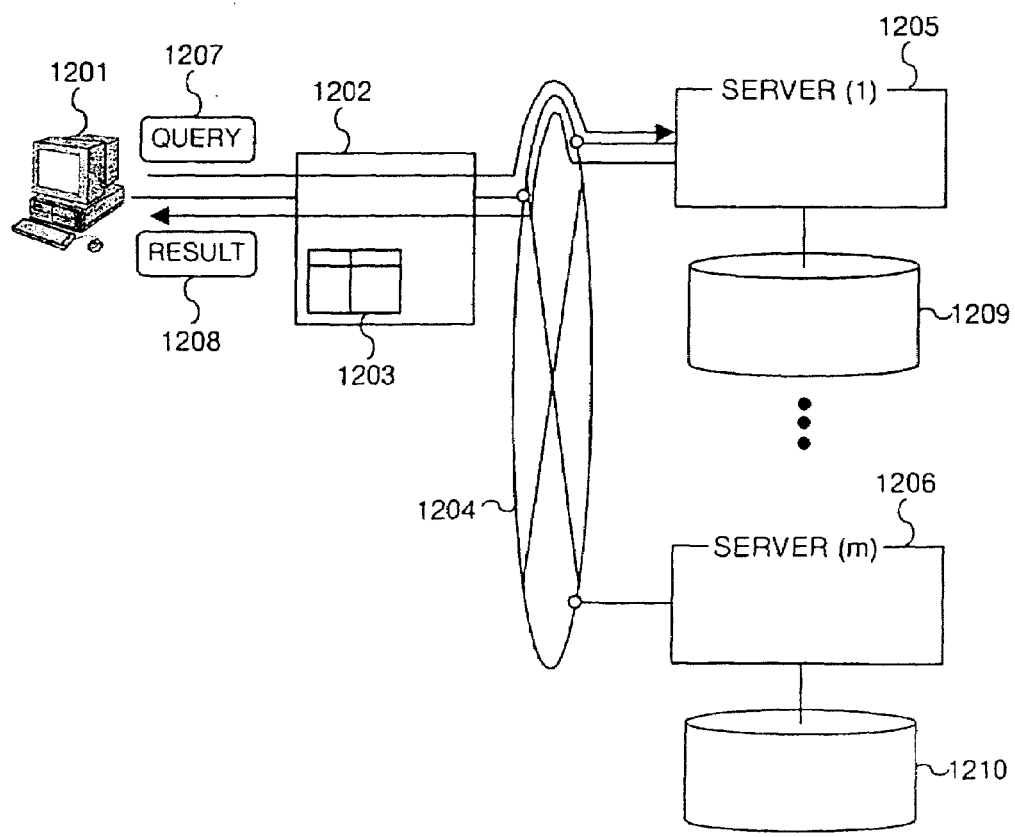
FIG. 12 is a diagram which shows how to compose a conventional data warehouse in a distributed environment.
Figure 13:
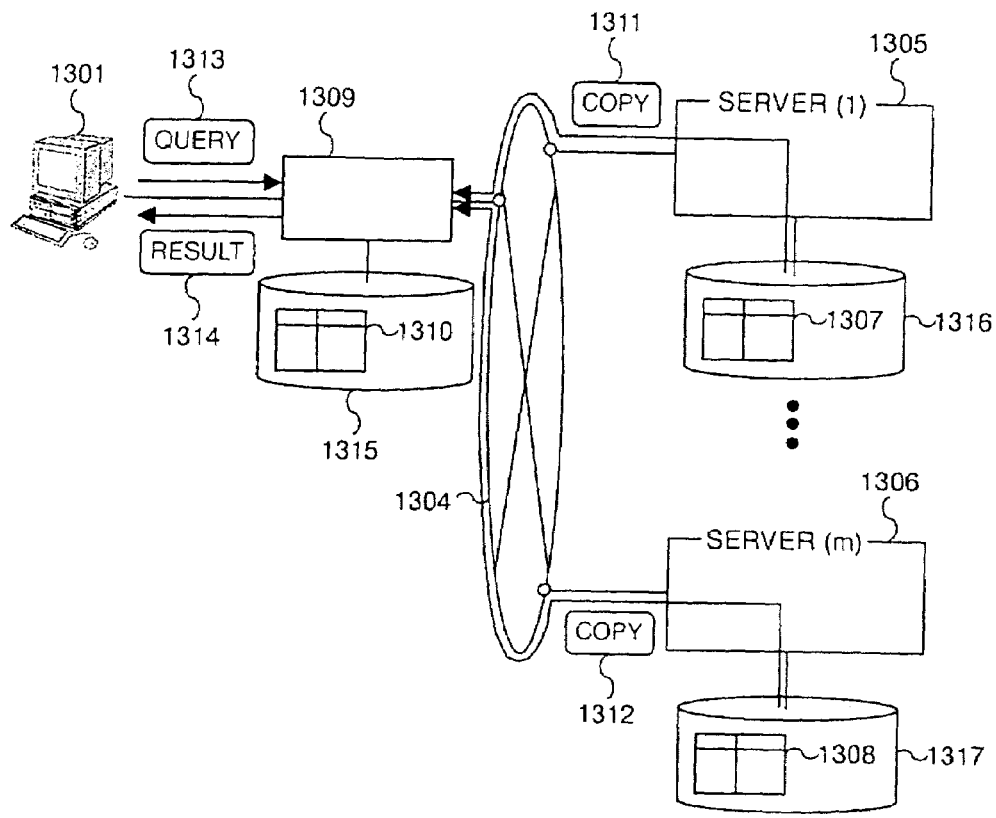
FIG. 13 is a diagram which shows how to compose a conventional data warehouse in a distributed environment.

(5) Hereunder, a query processing which uses a replica will be described with reference to FIGS. 1 and 4. If the client 103 issues a query to the data collector 101, the query is transferred to the query analysis unit 109 via the client management unit 105. Then, the query analysis unit communicates with the replica creation management unit 107 to reference to the replica management table (step 403). The query analysis unit decides according to the result of the reference the replica management table whether or not the query can be processed in its own data collector. If the query can be processed in its own data collector (if Yes is selected in the decision step 404), the query is processed in its own data collector (step 407) and the solution is transferred (step 415), thereby the query processing is ended (step 416). If the query cannot be processed in its own data collector (if No is selected in the decision step 404), it is determined whether or not the query can be processed in an cooperative data collector. If it is possible (if Yes is selected in the decision step 408), the query is transferred to the cooperative data collector (step 411) and the query analysis unit receives the solution (step 412) and transfers the solution to, the client (step 415), then ends the query processing. If the query cannot be processed in any of its own and cooperative data collectors (if No is selected in the decision step 409), the query analysis unit transfers the query to the server (step 413) and receives the solution (step 414), then transfers the solution to the client (step 415) and ends the query processing (step 416).

To decide whether or not a query issued from a client can be processed with a replica, the replica management table which describes the contents of existing replicas is compared with the issued query. More concretely, the entries in the replica management table (hereafter, to be referred just as entries) are compared with the issued query. If the query has the same value as that of an entry or the query is included in the entry in the management table, the replica can be used to process the query. This decision is the same as the decision for whether or not an existing replica can be used to process a new replica creation request as described above.

In the processing of a new replica creation request, because it is possible to decide whether or not the replica can be used to process the query with the use of the method of the aforementioned Ullman publication even for a general case, the present invention makes it possible to process each query with the use of a replica stored in its own data collector and a replica stored in a cooperative data collector.

Hereunder, a query processing which uses a replica will be described in detail with reference to FIGS. 1 and 8. In this case, it is premised that a client has issued a query of "find numbers of orders whose prices are over ¥20,000 and the order prices". Receiving the query from the client 103, the client management unit 105 of the data collector 1 transfers the query to the query analysis unit 101. The query analysis unit 101 then references the replica management table 108 and concludes that a replica stored in its own data collector 1, which corresponds to an entry 807, can be used to process the issued query. The analysis unit 101 thus processes the query with the use of the replica. Consequently, the query processing is not transferred to the server in this case. Next, it is assumed that the client issues a query of "find the numbers of orders whose prices are ¥3, 000 or under". In this case, the query analysis unit 101 references to the replica management table and concludes that a replica stored in the data collector 2, which corresponds to the entry 808, can be used to process the query. The query analysis unit 101 thus transfers the query to the data collector 2. Finally, it is assumed that the client 103 issues another query "find numbers of customers who have ordered goods whose prices are ¥7, 500". In this case, the query analysis unit 101 concludes that there is no entry in the replica management table shown in FIG. 8, which is usable for processing the query, thus no replica can be used to process the query. The analysis unit 101 therefore transfers the query to the server.

Although it is assumed that the data collector can obtain the name of a server which can obtain necessary data by using a distributed network basis technique such as CORBA, etc. in the above case, the present invention can be used even when the data collector cannot manage server information.

According to the method of the present invention for building data warehouses, for example, a method for grouping clients, it is possible to have data shared among clients, thereby the capacity of each client storage unit, updating cost, and network load can be reduced. Furthermore, it is possible to create replicas which can be used at a high usage rate for queries from users while considering the computer resources of the data collector which create replicas through negotiations with the server. The server supplies data according to its request condition given from the user for creating a replica. If the replica is used to process a query from a client, the server load can be reduced and a practical data warehouse system can be built, and the data warehouse system can be used to process queries.

The invention claimed is:

1. A data warehouse system, comprising:
a plurality of client devices, each for accepting a processing request from each user thereof;
a server provided with a database and used for searching said database according to access requests from said client devices;
a data collector, which is separate from said server and associated with said client devices and is provided with a storage device, for collecting data requested by users of said client devices and storing the data into said storage device as a replica which is partially replicating said database; and
a network for connecting said client devices to said server respectively via said data collector,
wherein said data collector comprises:
a replica creation control means for determining whether a new replica of said database is to be created and stored in said storage device, in response to a replica creation request from one of said client devices, by referring to a replica management table which holds at least a data range and a data updating interval of each replica stored in the storage device,
a query analysis unit for analyzing a query processing request from one of said client devices to select, as an object to be searched, a replica stored in said storage device or said database,
a query processing unit for searching said replica stored in said storage device according to a query analysis result from said query analysis unit, and
a communication control unit for selecting a procedure for accessing said server according to said query analysis result, and
wherein said server comprises:
a communication control unit for receiving said query analysis result transmitted from said data collector, and
a query processing unit for searching the database of said server.

2. A data warehouse system, comprising:
a plurality of client devices, each for accepting processing a request from each user thereof
a server provided with a database and used for searching said database according to access requests from said client devices;
a plurality of data collectors which are separate from said server, each data collector being associated with at least one of said client devices and each being provided with a storage device, each for collecting data requested by a corresponding user and storing the data into said storage device as a replica partially replicating said database; and
a network for connecting said client devices to said server respectively via an associated data collector,
wherein each of said data collectors comprises:
a replica creation control means for determining whether a new replica of said database is to be created and stored in said storage device, in response to a replica creation request from a corresponding client device, by referring to a replica management table which holds replica descriptions at least including a data range and a data updating interval of each replica stored in the storage device, and
a query analysis unit for analyzing a query processing request from one of said client devices to select, as an object to be searched, a replica stored in said storage device according to a query analysis result from said query analysis unit,
a query processing unit for searching said replica stored in said storage device according to a query analysis result from said query analysis unit, and
a communication control unit for selecting a procedure for accessing said server according to said query analysis result, and
wherein said server comprises:
a communication control unit for receiving said query analysis result transmitted from said data collector, and
a query processing unit for searching the database of said server.

3. A data warehouse system according to claim 2, wherein said replica management table further holds additional replica descriptions including a data range, a data updating interval and a location of each replica stored in storage device of cooperative data collectors, and wherein said replica creation control means determines whether a new replica of said database is to be created and stored or not, by further referring to additional replica descriptions.

* * * * *